US011442475B2

(12) United States Patent
Iwakura et al.

(10) Patent No.: US 11,442,475 B2
(45) Date of Patent: Sep. 13, 2022

(54) UNMANNED AIRCRAFT AND METHOD FOR CONTROLLING UNMANNED AIRCRAFT

(71) Applicant: Autonomous Control Systems Laboratory Ltd., Chiba (JP)

(72) Inventors: Daisuke Iwakura, Chiba (JP); Yuji Ogawa, Chiba (JP); Nobuyuki Togashi, Chiba (JP)

(73) Assignee: AUTONOMOUS CONTROL SYSTEMS LABORATORY LTD., Chiba (JP)

( * ) Notice: Subject to any disclaimer, the term of this patent is extended or adjusted under 35 U.S.C. 154(b) by 540 days.

(21) Appl. No.: 16/464,274

(22) PCT Filed: Oct. 23, 2017

(86) PCT No.: PCT/JP2017/038225
§ 371 (c)(1),
(2) Date: May 27, 2019

(87) PCT Pub. No.: WO2018/110088
PCT Pub. Date: Jun. 21, 2018

(65) Prior Publication Data
US 2020/0285253 A1 Sep. 10, 2020

(30) Foreign Application Priority Data
Dec. 12, 2016 (JP) .............................. JP2016-240595

(51) Int. Cl.
G05D 1/10 (2006.01)
B64C 39/02 (2006.01)
(Continued)

(52) U.S. Cl.
CPC ........... G05D 1/105 (2013.01); B64C 39/024 (2013.01); B64D 25/00 (2013.01); B64D 27/24 (2013.01);
(Continued)

(58) Field of Classification Search
CPC ...... G05D 1/105; G05D 1/101; B64C 39/024; B64C 2201/027; B64C 2201/042;
(Continued)

(56) References Cited

U.S. PATENT DOCUMENTS 8,979,023 B1 * 3/2015 Wang .................... B64D 45/00
244/100 A
9,520,066 B2 * 12/2016 Spinelli ................ G08G 5/0021
(Continued)

FOREIGN PATENT DOCUMENTS

JP 2013-528854 A 7/2013
JP 2014-181034 A 9/2014
(Continued)

OTHER PUBLICATIONS

International Search Report dated Dec. 26, 2017 for PCT/JP2017/038225 filed on Oct. 23, 2017, 10 pages including English Translation of the International Search Report.

Primary Examiner — Aniss Chad
Assistant Examiner — Christine Nguyen Huynh
(74) Attorney, Agent, or Firm — Xsensus LLP

(57) ABSTRACT

An unmanned aircraft 1 according to an embodiment of the present invention provides an unmanned aircraft that properly makes a forced landing in case of an abnormality. The unmanned aircraft 1 is configured as a multicopter that flies with lift and thrust generated by rotation of six rotors 13. The unmanned aircraft 1 identifies a forced landing site in a case of having detected an abnormality during flight and controls motors 12 configured to drive the respective rotors 13, to make a landing at the identified forced landing site. The unmanned aircraft 1 is consequently enabled to make an autonomous forced landing at a specific site in case of an abnormality.

8 Claims, 7 Drawing Sheets

(51) Int. Cl.
*B64D 25/00* (2006.01)
*B64D 27/24* (2006.01)
*B64D 31/06* (2006.01)
*B64D 47/08* (2006.01)

(52) U.S. Cl.
CPC ............ *B64D 31/06* (2013.01); *B64D 47/08* (2013.01); *B64C 2201/027* (2013.01); *B64C 2201/042* (2013.01); *B64C 2201/108* (2013.01); *B64C 2201/127* (2013.01); *B64C 2201/141* (2013.01)

(58) Field of Classification Search
CPC ........ B64C 2201/108; B64C 2201/127; B64C 2201/141; B64D 25/00; B64D 27/24; B64D 31/06; B64D 47/08
See application file for complete search history.

(56) References Cited

U.S. PATENT DOCUMENTS

| | | | |
|---|---|---|---|
| 2016/0114905 A1* | 4/2016 | Derenick | G08G 5/0021 701/16 |
| 2016/0140851 A1* | 5/2016 | Levy | G08G 5/0034 701/410 |
| 2017/0212528 A1* | 7/2017 | Henderson | B64F 1/00 |
| 2017/0278406 A1* | 9/2017 | Akselrod | G08G 5/0091 |
| 2017/0313433 A1* | 11/2017 | Ozaki | B64D 17/80 |

FOREIGN PATENT DOCUMENTS

| | | |
|---|---|---|
| JP | 2016-88111 A | 5/2016 |
| JP | 2016-518286 A | 6/2016 |
| JP | 2016-524567 A | 8/2016 |

\* cited by examiner

| PASSED SITE(S) | FORCED LANDING SITE |
|---|---|
| 1 | 1 |
| 2, 3 | A |
| 4 | B |
| 5, 6 | C |
| 7 | 8 |

FIG. 5

UNMANNED AIRCRAFT AND METHOD FOR CONTROLLING UNMANNED AIRCRAFT

CROSS-REFERENCE TO RELATED APPLICATIONS

The present application is based on PCT filing PCT/JP2017/038225, filed Oct. 23, 2017 which claims priority to JP 2016-240595, filed Dec. 12, 2016, the entire contents of each are incorporated herein by reference.

TECHNICAL FIELD

The present invention relates to an unmanned aircraft and a method for controlling the unmanned aircraft and particularly relates to an unmanned aircraft (rotary-wing drone) including a plurality of rotors (rotary wings) and a method for controlling the unmanned aircraft.

BACKGROUND ART

Unmanned aircrafts configured to fly under remote control or autonomous control (referred to as drones in some cases) have been known. Such unmanned aircrafts are typically configured as multicopters with a plurality of rotors (rotary wings) and used in various fields including industrial application. For example, such unmanned aircrafts are expected to be used in fields such as physical distribution, disaster response, infrastructure operation and maintenance, surveys, and agriculture, forestry, and fishery industries.

PTL 1 below discloses an operation of such an unmanned aircraft in case of an abnormality. Specifically, PTL 1 discloses a multicopter configured to, in case of an abnormality of a battery, a motor, or the like, continue flying and make a landing under remote control by a user in a case of being able to continue flying, while making a forced landing by using an air bag and a parachute in a case of being not able to continue flying.

CITATION LIST

Patent Literature

PTL 1: JP 2016-088111A

SUMMARY OF INVENTION

Technical Problem

The above-described known multicopter, however, needs remote control by a user in a case of an abnormality and a case of being able to continue flying. Hence such a technique is not applicable, for example, to a case in which an unmanned aircraft autonomously flies without remote control by a user, and the unmanned aircraft has no choice but to make a soft landing at an arbitrary location, by using an air bag or the like, even in a case of being able to continue flying. As seen above, there is still room for improvement in operation of an unmanned aircraft in case of an abnormality.

Embodiments of the present invention have an object to provide an unmanned aircraft that properly makes a forced landing in case of an abnormality. Other objects of the embodiments of the present invention will be made apparent with reference to the entire description.

Solution to Problem

An unmanned aircraft according to an embodiment of the present invention is an unmanned aircraft including a plurality of rotors, the unmanned aircraft including: a plurality of motors configured to drive the plurality of rotors respectively; and a control unit configured to control at least the plurality of motors, wherein in a case of having detected an abnormality during flight, the control unit identifies a forced landing site and controls at least part of the plurality of motors to make a landing at the identified forced landing site. Such a configuration enables an autonomous forced landing at the specific site in case of an abnormality.

Here, the forced landing site may be identified by using various techniques. For example, the above-described unmanned aircraft may be configured to identify the forced landing site from among a plurality of predetermined sites. More specifically, for example, the above-described unmanned aircraft may be configured so that the control unit controls the plurality of motors to automatically fly in accordance with information on a flight route to a destination site including one or a plurality of via-points, and identifies, in the case of having detected the abnormality during flight, the forced landing site from among the plurality of predetermined sites, based at least on one or more via-points where the unmanned aircraft has passed through. The above-described unmanned aircraft may, for example, further include a position detection unit configured to detect a current position, wherein the control unit identifies the forced landing site from among the plurality of predetermined sites, based at least on the current position detected by the position detection unit. Such a configuration supports simple identification of the forced landing site. Note that at least part of the plurality of predetermined sites are arbitrary sites set by an operator or sites set on a map in advance.

The above-described unmanned aircraft may, for example, further include an image capturing unit, wherein the control unit identifies the forced landing site, based at least on an image of a ground captured by the image capturing unit. More specifically, for example, the above-described unmanned aircraft may be configured so that the control unit divides the image of the ground into a plurality of sections, determines safety degrees of each of the plurality of sections, and identifies the forced landing site included in the image of the ground, based at least on the determined safety degrees of the each of the plurality of sections. For example, the control unit may be configured to determine the safety degrees of the each of the plurality of sections by using a learned model. Such a configuration supports identification of an appropriate forced landing site, based on an image of a ground, irrespective of position of the unmanned aircraft at an occurrence of an abnormality.

The above-described unmanned aircraft may further include a soft landing device for making a soft landing, wherein in a case of having detected an abnormality during flight and a case that a landing at a specific forced landing site is impossible, the control unit actuates the soft landing device. Here, the soft landing device may be configured as a device for making a soft landing by using a parachute or an airbag, for example. Such a configuration enables a soft landing in a case that a forced landing at a specific site is impossible.

The above-described unmanned aircraft may be configured so that the control unit detects an abnormality, based on information received from outside. For example, the control unit may be configured to receive, from a cloud server configured to manage operation information of the unmanned aircraft, the operation information or abnormality detection information based on the operation information and detect an abnormality, based on the information.

The above-described unmanned aircraft may be configured so that the control unit controls the motors via a motor driving control unit and detects an abnormality of the motors, based at least on operation information of the motors received from the motor driving control unit.

A method according to an embodiment of the present invention is a method for controlling an unmanned aircraft including a plurality of rotors, the method including the steps of: in a case of having detected an abnormality during flight, identifying a forced landing site; and controlling at least part of a plurality of motors configured to drive the plurality of rotors respectively, to cause the unmanned aircraft to make a landing at the identified forced landing site. Such a configuration enables an autonomous forced landing at the specific site in case of an abnormality.

Advantageous Effects of Invention

Various embodiments of the present invention provide an unmanned aircraft that properly makes a forced landing in case of an abnormality.

BRIEF DESCRIPTION OF DRAWINGS

FIG. 5 is a diagram illustrating an example of a correspondence relationship between sites included in the flight route and a forced landing site.

DESCRIPTION OF EMBODIMENTS

Figure 1:
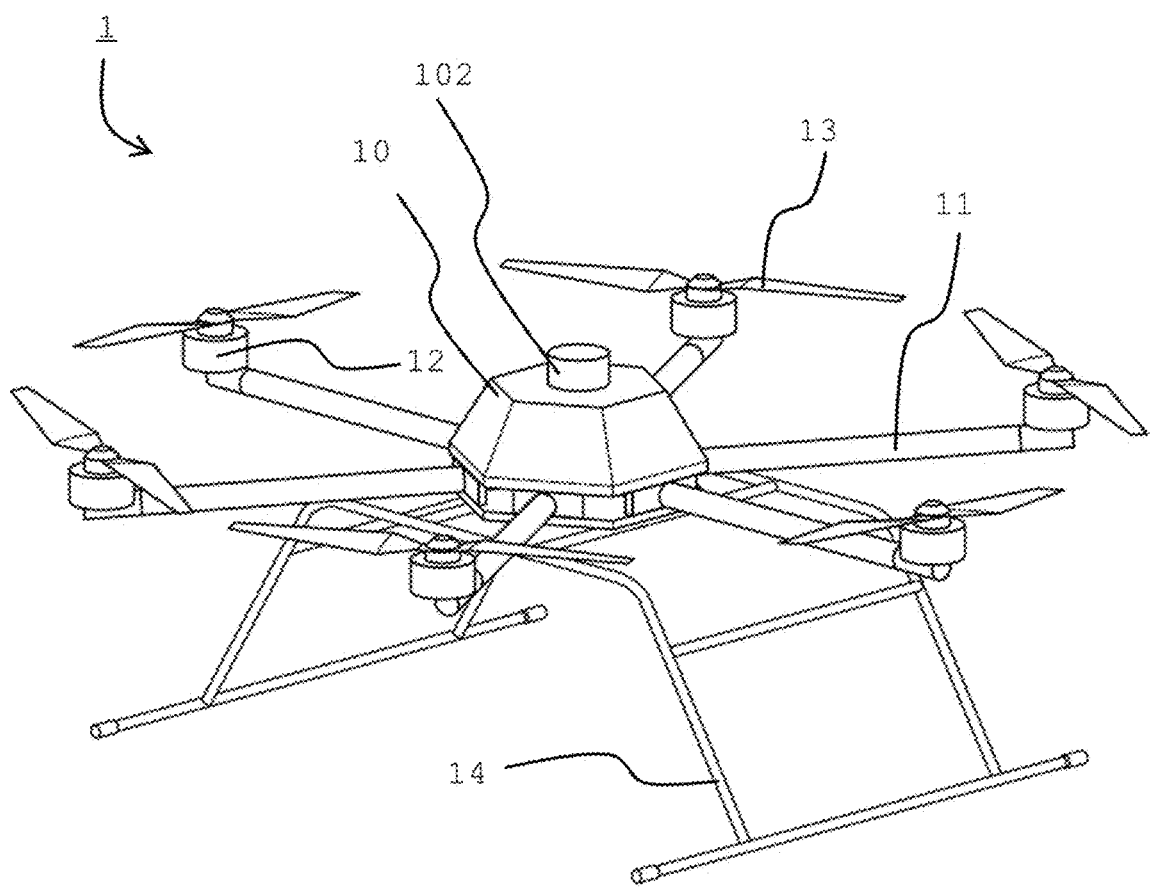
FIG. 1 is an external view of an unmanned aircraft 1 according to an embodiment of the present invention.
Figure 2:
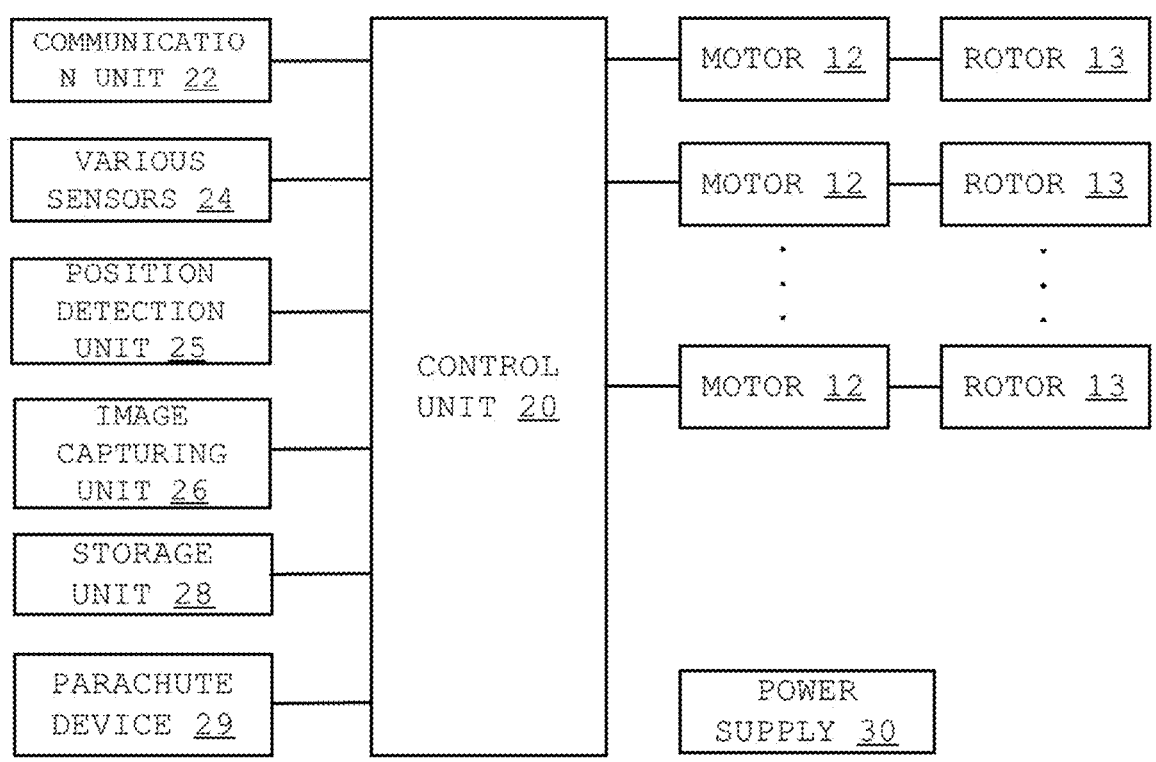
FIG. 2 is a block diagram schematically illustrating a configuration of the unmanned aircraft 1.

Embodiments of the present invention will be described below with reference to the drawings. FIG. 1 is an external view of an unmanned aircraft 1 according to an embodiment of the present invention. FIG. 2 is a block diagram schematically illustrating a configuration of the unmanned aircraft 1.

As illustrated in FIG. 1, the unmanned aircraft 1 includes: a main body part 10 which is a box-shaped member having a hexagonal outline when seen from above; six arms 11 each linearly extending outward from the main body part 10; six motors 12 provided at respective outer end portions of the arms 11; six rotors 13 provided above the respective motors 12 and driven by the motors 12; and a leg part 14 provided on a lower side of the main body part 10. The six rotors 13 are provided at substantially equal intervals on a virtual circle with the main body part 10 as the center. The unmanned aircraft 1 is configured as a multicopter that flies (ascends, descends, horizontally moves, changes in direction, and the like) with lift and thrust generated by rotation of the rotors 13.

As illustrated in FIG. 1, a parachute housing part 102 configured to house a parachute is provided on an upper face of the main body part 10.

As illustrated in FIG. 2, the unmanned aircraft 1 includes a control unit 20, a communication unit 22, various sensors 24, a position detection unit 25, an image capturing unit 26, a storage unit 28 configured to store information, a parachute device 29, and a power supply 30 configured to supply power to the units of the unmanned aircraft 1. At least part of these units may be housed in the box-shaped main body part 10.

The control unit 20 is configured, for example, as a small computer to control the parts and units of the unmanned aircraft 1 including the motors 12. In the present embodiment, the control unit 20 may be configured to perform more advanced control in addition to control of the motors 12 and the like and may be configured to perform, for example, sensor fusion for comprehensively evaluating various kinds of information acquired via the various sensors 24 to be described later, various kinds of image processing, risk determination, various computations using artificial intelligence (AI) (such as a learned model like a neural network), and the like.

The communication unit 22 performs wireless communication with a user device, such as a remote controller (proportional system) or the like used by a user (operator), another unmanned aircraft, and the like.

The various sensors 24 include various sensors necessary for various controls of the unmanned aircraft 1. For example, the various sensors 24 include an altitude sensor (barometric pressure sensor), a direction sensor (electromagnetic compass), an acceleration sensor, a gyro sensor (angular rate sensor), and the like.

The position detection unit 25 detects a current position of the unmanned aircraft 1. For example, the position detection unit 25 includes a Global Positioning System (GPS) receiver.

The image capturing unit 26 is configured as a common digital camera capable of capturing still images and moving images. In the present embodiment, the image capturing unit 26 is provided on a lower face of the main body part 10 and configured to be able to capture an image in a ground direction (downward direction from the main body part 10). The image captured via the image capturing unit 26 may be recorded in the storage unit 28.

The parachute device 29 includes a parachute housed in the parachute housing part 102 and a known mechanism for releasing the parachute.

Next, operations of the unmanned aircraft 1 thus configured will be described. First, an operation of the unmanned aircraft 1 in a normal state will be described. The unmanned aircraft 1 flies under remote control using the remote controller by the user or autonomous control. Specifically, when the control unit 20 controls the motors 12, based on a flight command according to remote control or autonomous control and various values input from the various sensors 24, the unmanned aircraft 1 ascends, descends, horizontally moves, or changes in direction by the lift and thrust acting on the rotors 13 rotary-driven by the motors 12. Note that the six rotors 13 are configured so that each two adjacent rotors 13 rotate in directions different from each other and each two rotors 13 located opposite to each other across the main body part 10 rotate in the same direction.

For example, the unmanned aircraft 1 hovers by keeping in balance the gravity acting on the unmanned aircraft 1 itself and an upward force including lift acting on the rotating rotors 13, ascends by making the upward force greater than the gravity by increasing the number of rotations of the six rotors 13, and descends by making the upward force smaller than the gravity by decreasing the number of rotations of the rotors 13.

For example, the unmanned aircraft 1 inclines in a specific direction by changing the number of rotations of at least part of the six rotors 13, and as a result of the inclination, the rotation surface of the rotors 13 inclines to the horizontal to thereby generate a thrust component in the horizontal direction, which horizontally moves the unmanned aircraft 1 to the specific direction. For example, the unmanned aircraft 1 can horizontally move in a specific direction by making the number of rotations of two rotors 13 positioned on the specific direction side among the six rotors 13 smaller than the number of rotations of two rotors 13 positioned on the side opposite to the specific direction.

For example, the unmanned aircraft 1 changes in direction (horizontally rotates) to a specific direction by making the number of rotations of three rotors 13 rotating in the specific direction among the six rotors 13 smaller than the number of rotations of three rotors 13 rotating in the direction opposite to the specific direction.

Figure 3:
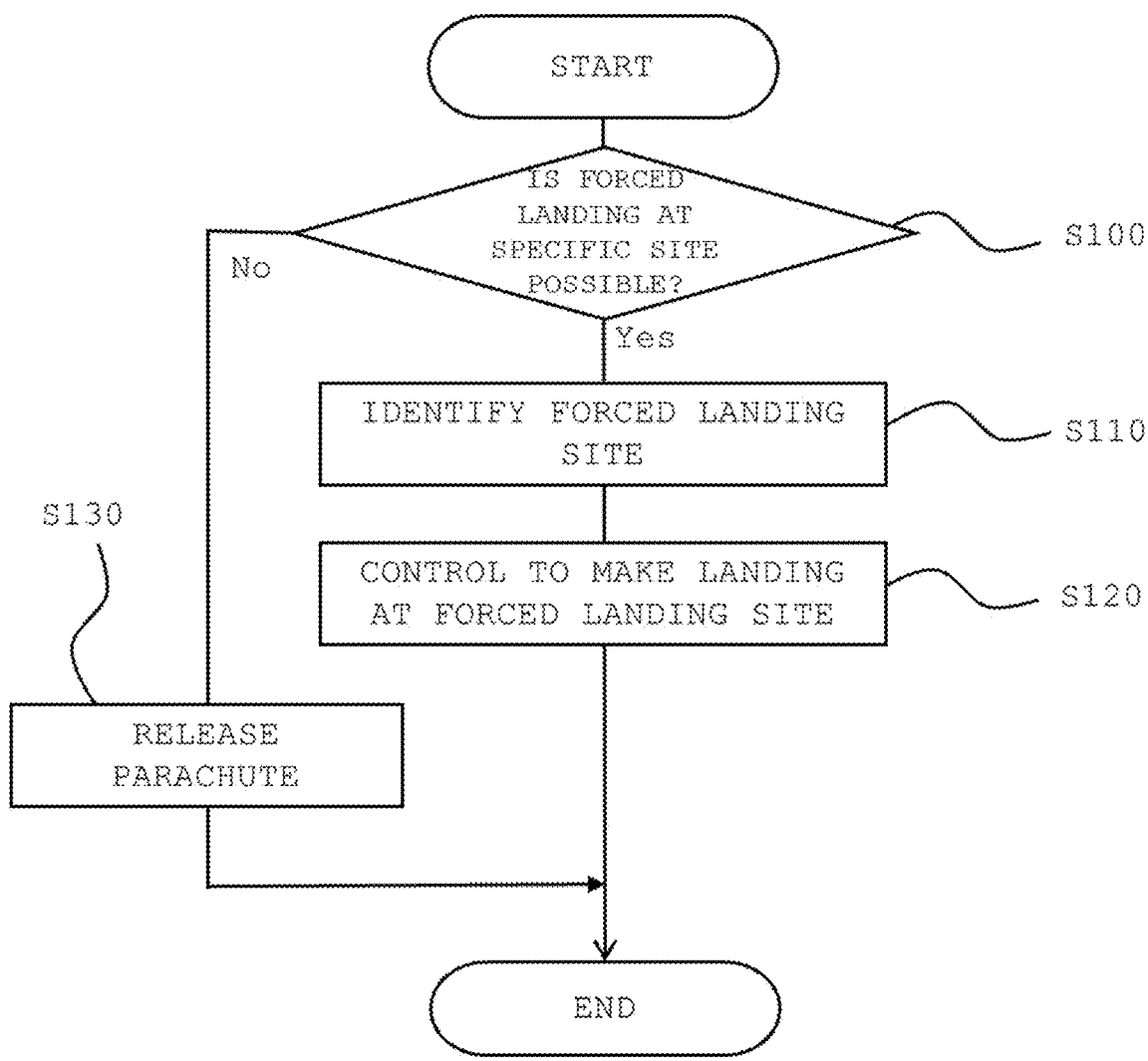
FIG. 3 is a flowchart illustrating processing performed in case of an abnormality of the unmanned aircraft 1.

Next, an operation of the unmanned aircraft 1 in case of an abnormality will be described. FIG. 3 is a flowchart illustrating an example of processing performed by the control unit 20 when an abnormality of the unmanned aircraft 1 is detected. The processing is performed, for example, when the control unit 20 detects an abnormality of one or more of the motors 12. The abnormality of the motors 12 is detected based, for example, on electric current, voltage, the number of vibrations, the number of rotations, temperature, and the like. In the embodiment of the present invention, an abnormality of the unmanned aircraft 1 is not limited to an abnormality of the motors 12 and may include an abnormality of the power source 30 or any of the other parts in addition to the motors 12, an abnormality of wireless communication via the communication unit 22, and the like.

In the present embodiment, the motors 12 are configured, for example, as three-phase brushless motors and are driven by current control using known sensorless vector control. Specifically, an electronic speed controller (ESC) (motor driving control unit) estimates a rotational position of each rotor, based on induced voltage and the like and determines, based on the estimated rotational position, an electric current (or voltage) to be supplied to each of the phases U, V, and W, by using vector control.

For example, the ESC drives each of the motors 12 in accordance with a pulse width modulation (PWM) method of changing a supply time ratio (duty ratio) of a constant voltage to thereby change an effective supply voltage, by using, as an input, a rotational speed command from the control unit 20, and also transmits operation information such as rotational speed and electric current of each of the motors 12 to the control unit 20. The control unit 20 then compares a value of the rotational speed command for each of the motors 12 with an actual measurement value received from the ESC to thereby be able to determine an abnormality of the motor 12. For example, when the actual measurement value is smaller than the command value by a certain value (ratio) or more, the control unit 20 can determine an abnormality of the motor 12. When load on the motor 12 increases, the electric current passing through the motor 12 also increases. Hence, detecting the electric current of the motor 12 enables estimation of the load on the motor 12, which also enables estimation of change of the load, i.e., disturbance. When an excessive disturbance is detected, the control unit 20 can determine an abnormality of the motor 12.

Return to FIG. 3, when an abnormality of the unmanned aircraft 1 is detected, the control unit 20 first determines whether or not a forced landing at a specific site is possible (Step S100). This determination may be performed by applying various criteria. For example, the control unit 20 determines whether or not a forced landing at a specific site is possible, based on the number and/or arrangement of failed motors 12 among the six motors 12. For example, in a case that the number of failed motors 12 is one, the control unit 20 determines that a forced landing at a specific site is possible. Also, in a case that the number of failed motors 12 is two or more, the control unit 20 determines that a forced landing at a specific site is impossible.

When a forced landing at a specific site is determined to be possible (YES in Step S100), the control unit 20 identifies a forced landing site (Step S110). In the present embodiment, the forced landing site is identified from among a plurality of predetermined sites (forced landing site candidates). In this case, for example, the control unit 20 selects, based on the current position of the unmanned aircraft 1 detected by the position detection unit 25, the candidate that is the closest to the current position from among the plurality of forced landing site candidates as the forced landing site. The plurality of forced landing sites may, for example, be stored in the storage unit 28 in advance. The plurality of forced landing sites are arbitrary sites set by a user or sites set on a map in advance as public landing sites and the like.

Here, the unmanned aircraft 1 in the present embodiment includes an autonomous flight mode for autonomously flying according to a predetermined flight route. A method for identifying a forced landing site in the autonomous flight mode will be described below.

In the autonomous flight mode, the control unit 20 controls the motors 12 so as to fly according to a flight route included in flight route information stored in the storage unit 28 or the like. The flight route includes one or a plurality of via-points from a departure site to a destination site. Each site and each point may be identified using geographic coordinates (latitude and longitude) and altitude.

Figure 4:
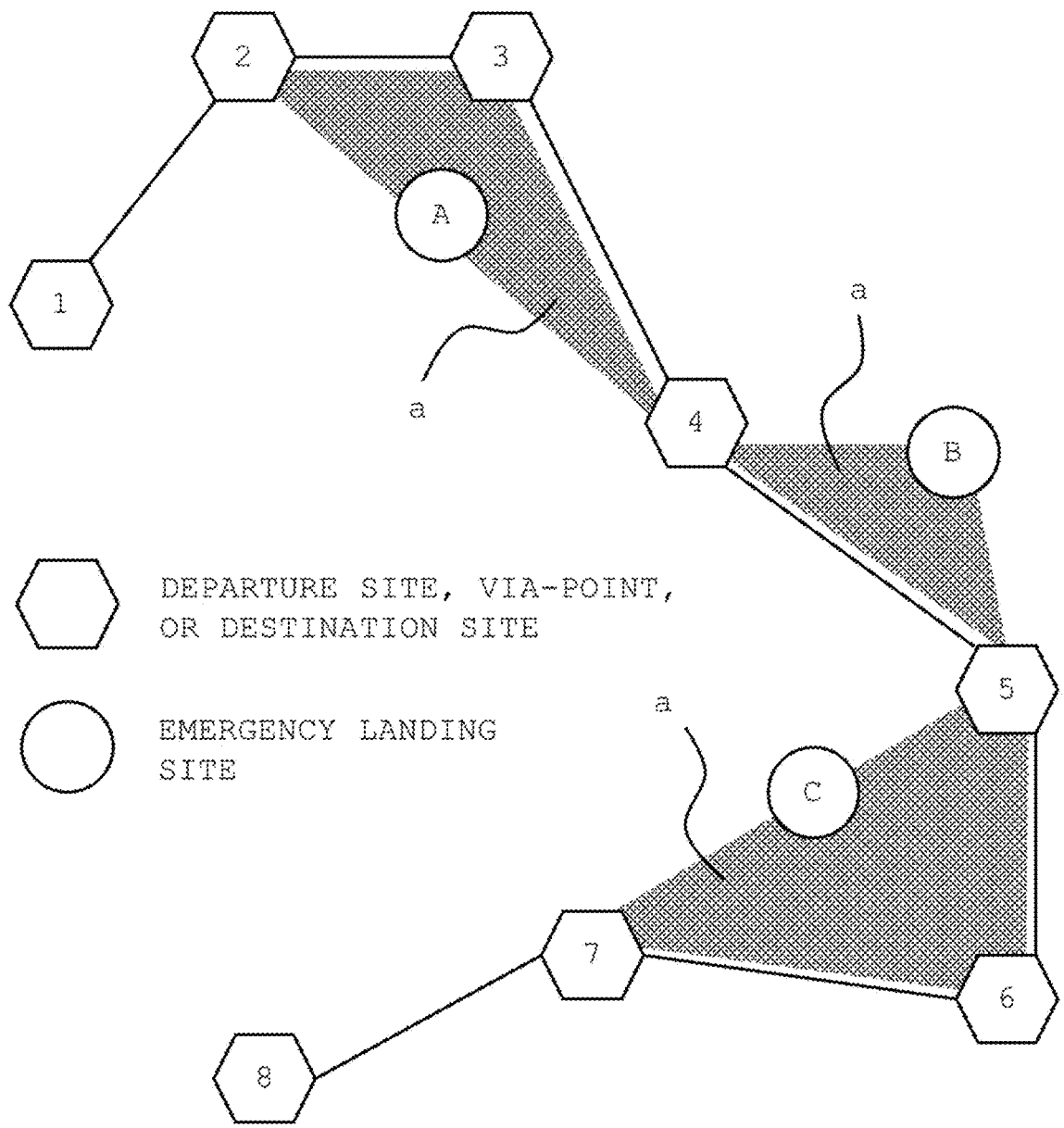
FIG. 4 is a diagram illustrating an example of a flight route and emergency landing sites.

FIG. 4 is a diagram illustrating an example of the flight route. In the example in FIG. 4, the hexagon assigned a numeral 1 indicates a departure site, the hexagons assigned numerals 2 to 7 indicate six via-points, and the hexagon assigned a numeral 8 indicates a destination site. The flight route indicates that the unmanned aircraft 1 moves from one site to another of the sites in the ascending order of the numerals assigned to the hexagons corresponding to the sites.

In the present embodiment, the flight route information includes information related to a plurality of (e.g., three) emergency landing sites to be forced landing site candidates. In the example in FIG. 4, three circles assigned alphabets A, B, and C indicate the emergency landing sites. Note that the emergency landing sites may be set as via-points in the flight route.

In the autonomous flight mode, the control unit 20 identifies a forced landing site, based on a via-point(s) over which the unmanned aircraft 1 has already passed. Specifically, the control unit 20 identifies a forced landing site, based on a correspondence relationship between a passed site(s) and a forced landing site included in the flight information. FIG. 5 is a diagram illustrating an example of the correspondence relationship between a passed site(s) and a forced landing site. In this example, in a case that the unmanned aircraft 1 has not reached the via-point 2 (a case that the passed site is only the departure site 1), the departure site 1 is identified as the forced landing site. Similarly, in a case that the unmanned aircraft 1 has passed over the via-point 2 or 3, the emergency landing site A is identified as the forced landing site; in a case that the unmanned aircraft 1 has already passed over the via-point 4, the emergency landing site B is identified as the forced landing site; in a case that the unmanned aircraft 1 has passed over the via-point 5 or 6, the emergency landing site C is identified as the forced landing site. In a case that the unmanned aircraft 1 has passed over the last via-point 7, the destination site 8 is identified as the forced landing site.

Here, each of three areas a in FIG. 4 indicates an area over which the unmanned aircraft 1 possibly passes in a case of flying to the emergency landing site A, B, or C from the flight route. The flight route and emergency landing sites may be set so that these areas a would be flight possible areas for the unmanned aircraft 1.

In another embodiment of the present invention, a forced landing site may be identified by using another technique. Specifically, for example, the control unit 20 may identify a forced landing site, based on an image of a ground captured via the image capturing unit 26. More specifically, the control unit 20 analyzes an image of the ground captured via the image capturing unit 26 at the time point of the capturing and identifies, as the forced landing site, a site that matches a predetermined condition from among areas of the ground included in the image (included in a field of view of the image capturing unit 26 at the time point). Here, when there exists no appropriate forced landing site (matching the above-described predetermined condition) among the areas of the ground included in the field of view of the image capturing unit 26 at the time when an abnormality is detected, the unmanned aircraft 1 may be moved horizontally in an arbitrary direction to search for an appropriate forced landing site.

Figure 6:
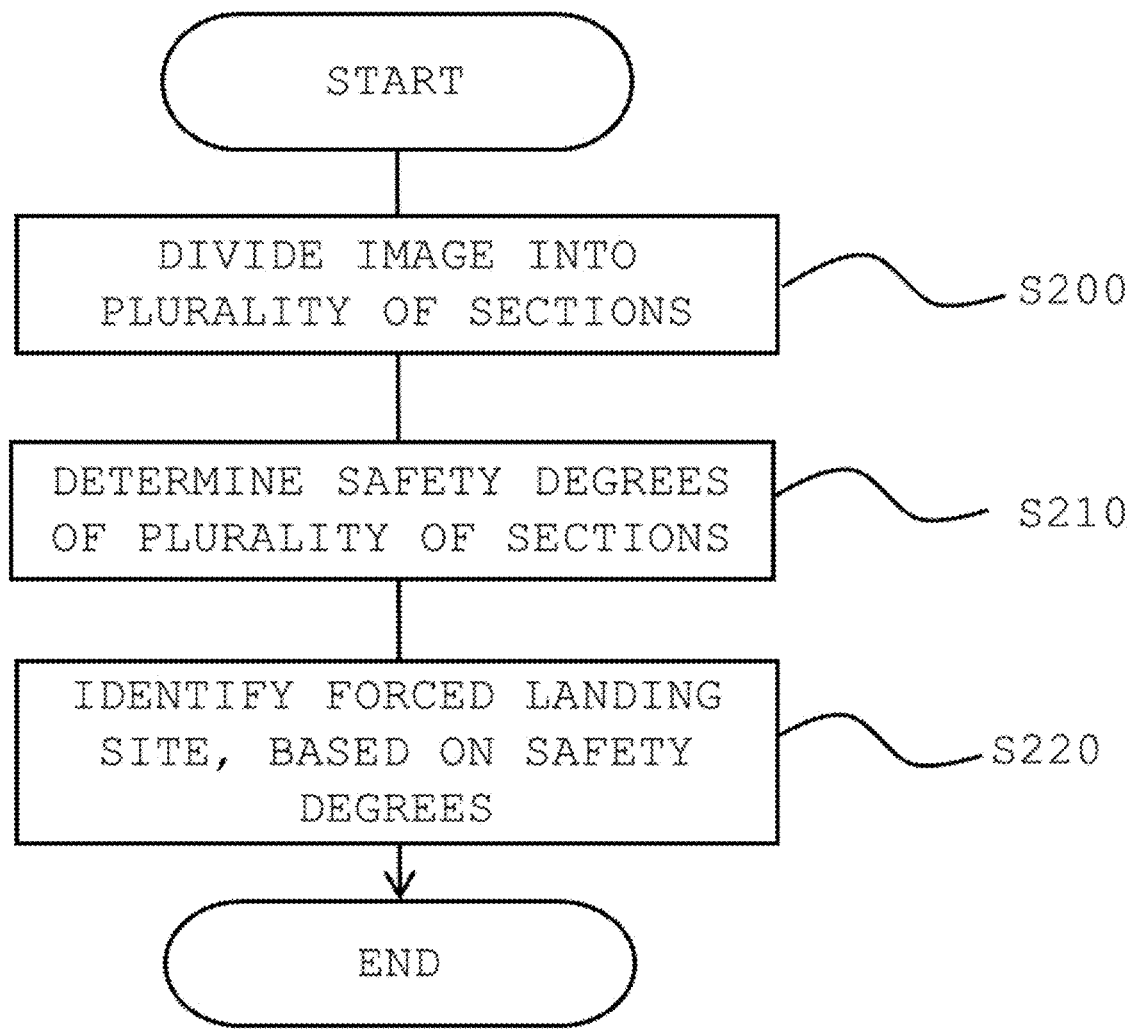
FIG. 6 is a flowchart illustrating processing performed when identifying a forced landing site, based on an image of a ground.

FIG. 6 is a flowchart illustrating an example of processing performed by the control unit 20 when identifying a forced landing site, in the other embodiment of the present invention configured to identify a forced landing site, based on an image of a ground. As illustrated, the control unit 20 first divides an image of a ground captured via the image capturing unit 26 into a plurality of sections (Step S200). In this embodiment, the image is divided into a plurality of sections each having a substantially square shape and arranged in lattice. Note that the shape and arrangement of the sections are not limited to these, and, for example, sections each having a regular hexagon shape may be arranged to have a honeycomb structure. The size (numbers of pixels in vertical and horizontal sides) of each section is set to have an appropriate value according to throughput of the control unit 20 and the like.

Subsequently, the control unit 20 determines safety degrees of the plurality of respective sections (Step S210). In this embodiment, determination of safety degrees of the respective sections is performed by using a learned model (AI). The learned model is configured as a neural network and is generated through machine learning using supervised data. The supervised data (correct answer data) is a number of images corresponding to the above-described sections, and each of the images is labeled "safe" or "unsafe". For example, an image including an obstacle (a person, an object, a building, a tree, or the like) is labeled "unsafe"; an image including no such obstacle is labeled "safe". The learned model thus generated is configured to output, upon input of the image of each of the sections, a corresponding safety degree. The safety degree is classified into three categories "safe", "unsafe", and "unknown".

Figure 7:
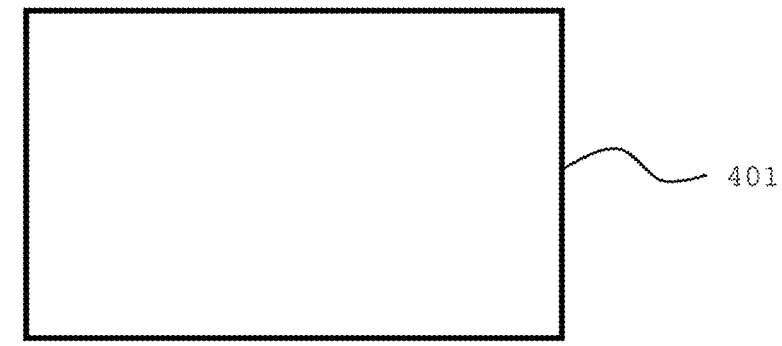
FIG. 7 is a diagram for describing how an image 401 is divided into a plurality of sections 41 and then safety degrees of the plurality of sections 41 are determined.
Figure 7:
Figure 7:
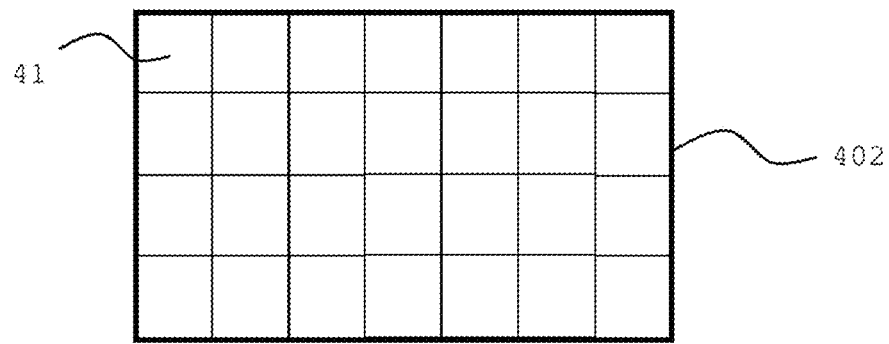
Figure 7:
Figure 7:
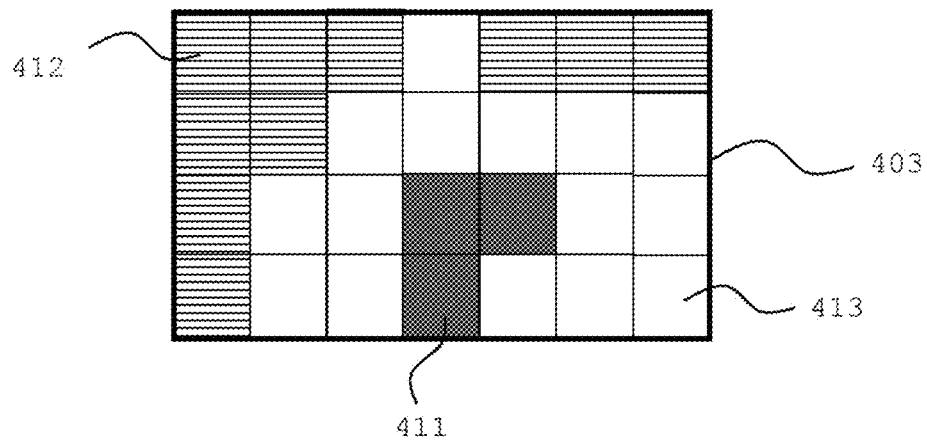

FIG. 7 is a diagram for describing how an image 401 of a ground is divided into a plurality of sections 41 and then safety degrees of the plurality of respective sections 41 are determined, in Steps S200 to S210. In FIG. 7, an image 402 located in a vertically middle part indicates a state in which the image 401 located above is divided into the plurality of sections 41. An image 403 located below indicates a state in which safety degrees are determined for the plurality of respective sections 41. In the image 403, sections 411 filled in with gray are sections determined as "safe"; hatched sections 412 are sections determined as "unsafe"; other sections 413 are sections determined as "unknown".

After such determination of the safety degrees of the respective sections, the control unit 20 identifies a forced landing site, based on a result of the determination of the safety degrees (Step S220). In this embodiment, the identification of a forced landing site is performed by using a heuristic algorithm (approximate algorithm) and is taken into consideration as a cost minimization problem using the following nonlinear cost function, for example.

$$f(x,u,\theta)=s(x)+\varepsilon(x,\theta,d(x))v(u)$$

Here, x denotes a position of any of the sections in the image (coordinates of a central portion of the section), $\theta$ denotes a parameter representing the posture of the unmanned aircraft 1 (direction and angle of inclination, or the like), d(x) denotes the distance between the unmanned aircraft 1 and x (section), and u denotes a parameter representing an emergency degree of a forced landing.

The function s(x) is a function corresponding to a result of the determination of the safety degrees of the respective sections. Specifically, the function s(x) gives a small value (cost) when the safety degree is "safe" while giving a large value (cost) when the safety degree is "unsafe". The function s(x, $\theta$, d(x)) is a function for estimating energy to be consumed by the unmanned aircraft 1 in a case of making a landing at x (section). This function converts a plane in the image into an actual ground and estimates the distance from the unmanned aircraft 1 to a position of the actual ground included in the section. The function v(u) is a function for giving a weight to be assigned to the function s(x, $\theta$, d(x)) according to the emergency degree of the forced landing. The emergency degree is determined by the control unit 20. For example, the emergency degree in a case of having detected an abnormality in one or more of the motors 12 is set to be high compared with the emergency degree in a case of having detected an abnormality of wireless communication.

The function f(x, u, $\theta$) thus configured gives a smaller value as the safety degree is higher or energy to be consumed at the time of landing is smaller. The control unit 20 identifies, as the forced landing site, x (section) given the smallest value of the function f(x, u, $\theta$).

Return to the flowchart of FIG. 3. Upon identification of the forced landing site, the control unit 20 then controls the motors 12 to make a landing at the identified forced landing site (Step S120). For example, in a case of failure in one of the motors 12, the control unit 20 causes the unmanned aircraft 1 to make a landing at the forced landing site by using the five rotors 13 corresponding to the other five motors 12. Here, such flight control of the unmanned aircraft 1 in case of a motor failure and the like can be performed by using a fault tolerance technique commonly known to those skilled in the art. For example, a paper written by Hossein Hashemi Nejad, Dominique Sauter, Samir Aberkane, and Suzanne Lesecq et al., "Actuator fault tolerant control in experimental Networked Embedded mini Drone", 17th Mediterranean Conference on Control & Automation, June 2009, issued by IEEE, and a paper written by Mark W. Mueller and Raffaello D'Andrea "Stability and control of a quadrocopter despite the complete loss of one, two, or three propellers", 2014 IEEE International Conference on Robotics & Automation (ICRA), May-June, 2014, issued by IEEE, disclose techniques of fault tolerant techniques in case of a failure of motors of a multicopter. Moreover, for example, the doctoral thesis of Guillaume Jacques Joseph Ducard "Fault-Tolerant Flight Control and Guidance Systems for a Small Unmanned Aerial Vehicle", Swiss Federal Institute of Technology in Zurich (2007) discloses a technique of a fault tolerant flight control for an unmanned aircraft (especially in FIGS. 2.3, 2.4, 5.2, 10.1, and 11.3 and related descriptions). Using such techniques allows the unmanned aircraft 1 to make a relatively safe landing at a forced landing site.

Here, in the embodiment in which a forced landing site is identified based on an image of a ground, the unmanned aircraft 1 is controlled based on computation of a linear landing path connecting the current position of the unmanned aircraft 1 and the forced landing site (specific section in the image), to fly along the linear path. Upon detection of coming closer to the ground by using a proximity sensor or the like included in the unmanned aircraft 1, the unmanned aircraft 1 starts predetermined autonomous control for soft landing.

In contrast, when a forced landing at the specific site is determined to be impossible (NO in Step S100), the control unit 20 releases the parachute (Step S130). Specifically, the control unit 20 controls the parachute device 29 to release the parachute housed in the parachute housing part 102 and also stops all the motors 12. Consequently, the unmanned aircraft 1 makes a soft landing near the current position.

The above-described unmanned aircraft 1 according to the present embodiment identifies a forced landing site in a case of having detected an abnormality during flight and controls the motors 12 to make a landing at the identified forced landing site. In this way, the unmanned aircraft 1 can make an autonomous forced landing at the specific site in case of the abnormality. Thus, the embodiments of the present invention provide an unmanned aircraft that properly makes a forced landing in case of an abnormality.

In the present embodiments, the control unit 20 may be configured to detect an abnormality, based on information received from outside. For example, the control unit 20 may detect an abnormality of the unmanned aircraft 1, based on information received via the communication unit 22 from a cloud server. For example, the cloud server collects and manages operation information of the unmanned aircraft 1 (e.g., operation information of the motors 12 and the like), transmits the operation information itself to the unmanned aircraft 1 or transmits, in a case of having detected an abnormality based on the operation information, abnormality detection information indicating the abnormality to the unmanned aircraft 1. Note that, in the control unit 20, an abnormality detection board for detecting an abnormality may be provided physically independent of a board for performing flight control and the like.

Embodiments of the present invention are not limited to the above-described embodiments, and various changes can be made without departing from the gist of the present invention. For example, the shapes, numbers, arrangements, and the like of the members in the above-described embodiments are changed appropriately. For example, the number of rotors included in the unmanned aircraft of the embodiments of the present invention is not limited to six and may be five or less or seven or more.

The invention claimed is:

1. An unmanned aircraft including a plurality of rotors, the unmanned aircraft comprising:
    a plurality of motors configured to drive the plurality of rotors respectively; and
    a control unit configured to control at least the plurality of motors to automatically fly in accordance with information on a flight route to a destination site, the information on the flight route including one or more via-points and a correspondence relationship between the one or more via-points and a plurality of predetermined sites, such that each via-point is assigned a specific predetermined site of the plurality of predetermined sites, wherein
    in a case of having detected an abnormality during flight, the control unit identifies the specific predetermined site as a forced landing site from among the plurality of predetermined sites based on the correspondence relationship assigned for a most recent via-point that the unmanned aircraft has passed through among the one or more via-points, and controls at least part of the plurality of motors to make a landing at the identified forced landing site.

2. The unmanned aircraft according to claim 1, wherein at least part of the plurality of predetermined sites are one or more arbitrary sites set by an operator or one or more sites set on a map in advance.

3. The unmanned aircraft according to claim 1, further comprising
    a soft landing device for making a soft, landing, wherein
    in the case of having detected the abnormality during flight and a case that a landing at a specific forced landing site is impossible, the control unit actuates the soft landing device.

4. The unmanned aircraft according to claim 1, wherein the control unit is configured to detect the abnormality, based on information received from outside.

5. The unmanned aircraft according to claim 1, wherein the control unit is configured to control the motors via a motor driving control unit and detects an abnormality in one or more of the motors, based at least on operation information of the motors received from the motor driving control unit.

6. The unmanned aircraft according to claim 1, wherein the plurality of predetermined sites includes at least one of the one or more via-points.

7. A method for controlling an unmanned aircraft including a plurality of rotors, the method comprising:
    in a case of having detected an abnormality during flight, identifying a forced landing site; and
    controlling at least part of a plurality of motors configured to drive the plurality of rotors respectively, to make a landing at the identified forced landing site, wherein
    the method further includes controlling at least the plurality of motors to automatically fly in accordance with information on a flight route to a destination site;
    the information on the flight route includes one or more via-points and a correspondence relationship between the one or more via-points and a plurality of predetermined sites such that each via-point is assigned a specific predetermined site of the plurality of predetermined sites; and
    identifying includes identifying the specific predetermined site as the forced landing site from among the plurality of predetermined sites based on the correspondence relationship assigned for a most recent via-point that the unmanned aircraft has passed through among the one or more via-points.

8. The method according to claim 7, wherein the plurality of predetermined sites includes at least one of the one or more via-points.

* * * * *